United States Patent Office 3,642,904
Patented Feb. 15, 1972

3,642,904
α,β-UNSATURATED KETONES
Carl M. Langkammerer, Wilmington, Del., assignor to E. I. du Pont de Nemours and Company, Wilmington, Del.
No Drawing. Original application May 17, 1966, Ser. No. 551,843. Divided and this application Nov. 16, 1967, Ser. No. 684,600
Int. Cl. C07c *49/20, 49/76*
U.S. Cl. 260—590
4 Claims

ABSTRACT OF THE DISCLOSURE

α,β-Unsaturated ketones of the formula:

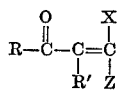

wherein
R is t-butyl, phenyl, substituted phenyl, naphthyl, chloronaphthyl, furyl, thienyl, or β-phenylethenyl;
R' is hydrogen or alkyl;
R and R' can be joined;
X and Z are separately either chlorodifluoromethyl or trifluoromethyl.

Typical is 1 - (3-chlorophenyl)-4,4,4-trifluoro-3-trifluoromethyl-2-buten-1-one useful in riot control.

CROSS REFERENCE

This application is a divisional of application Ser. No. 551,843, filed May 17, 1966.

SUMMARY OF THE INVENTION

This invention relates to α,β-unsaturated ketones.
More specifically, this invention refers to β,β-bis(trifluoromethyl)-α,β-unsaturated ketones, compositions employing them and a process of applying these compounds to animals for the purpose of causing disability.

THE INVENTION

The compounds of this invention possess the following structural formula:

(1)      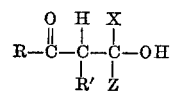

wherein
R is t-butyl, phenyl, methyl-, cyano-, fluoro-, chloro-, bromo-, methoxy- or nitro-substituted phenyl, naphthyl, chloronaphthyl, furyl, thienyl, β-phenylethenyl;
R' is hydrogen or alkyl of 1 through 8 carbon atoms;
R and R' can be combined to form cyclopentyl, α-tetrahydronaphthalene, 7 - nitrotetrahydronaphthalene or norbornane; and
X and Z are separately either chlorodifluoromethyl or trifluoromethyl.

The compounds of Formula 1 wherein R' is hydrogen are preferred because of high incidence of animal disability at low dose rates.

USE

The compounds of Formula 1 cause irritation to animals, affecting the eyes and upper respiratory tract. In aerosols the compounds could be used in riot control, rodent control or burglar alarm systems.

PREPARATION

Compounds of the present invention are made by starting with (2)     

wherein R, R', X and Z have the same meaning as above.
The compounds of Formula 2 are treated with thionyl chloride in di-methylformamide or are dehydrated by heating with acetic anhydride.

COMPOSITION

Compounds of this invention can be administered alone but are generally contained in a composition with a pharmaceutical carrier or diluent selected on the basis of the chosen route of administration and standard pharmaceutical practice. If the chosen route of administration is orally, the compounds can be administered in the form of tablets or capsules containing such excipients as starch, milk, sugar, clays and the like. Compounds can also be administered orally in the form of elixirs or oral suspensions containing coloring and flavoring agents.
If administered parenterally, the composition can take the form of sterile aqueous solutions containing solutes such as saline, or glucose in sufficient quantity to make the solution isotonic. For intramuscular administration, compositions of the compound of this invention can be prepared in an oil base such as peanut or sesame oil.
If administered as a vapor or spray application through the mouth or nasal passages a composition will contain some acceptable liquid such as water, acetone or alcohol.

DOSAGE

The amount of active ingredient in the compositions will vary from 0.005% to 95% by weight or even higher. Exact concentration of active ingredient will depend on the mechanism used for administration and will be easily understood by one knowledgeable in pharmaceutical application rates. The effective pharmaceutical dose of an intraveinous treatment is 0.5 to 5 milligrams of active compound per kilogram of body weight of the animal recipient. Rates of over 56 milligrams per kilogram of body weight will kill 50% of the animal recipients.
An effective pharmaceutical dose of an inhalation treatment is 0.5 to 2 milligrams per liter of air at exposure of one minute. More than 100 milligrams per liter of air at exposure of one minute is required to kill 50% of the animal recipients.
The following additional examples are provided to more clearly set forth the invention. All "parts" are by weight unless otherwise indicated.

EXAMPLE 1

A Hastelloy C autoclave with a 200 ml. capacity is charged with 60 parts of acetophenone, then evacuated and cooled in a liquid nitrogen bath and charged with 90 parts of hexafluoroacetone. The autoclave is sealed, heated at 160° for 8 hours and then cooled and opened. The 141 g. of liquid remaining is distilled in a spinning band fractionating column to give 133.4 parts (93% yield) of 3-hydroxy-1-phenyl-4,4,4 - trifluoro-3-trifluoromethyl-1-butanone boiling at 61–64° C. at 0.08 mm. of mercury and with a refractive index of $n_D^{25}$ 1.4410.

*Analysis.*—Calc'd for $C_{11}H_8F_6O_2$ (percent): C, 46.1; H, 2.8. M.W. 286. Found (percent): C, 46.3; H, 3.0. M.W. 288.

3 - hydroxy-1-phenyl-4,4,4-trifluoro-3-trifluoromethyl-1-butanone (14.3 parts), 5.8 of thionyl chloride, 0.4 part of dimethylformamide and 10 parts of dry toluene are placed in a flask attached to a condenser and protected from atmospheric moisture by a calcium chloride tube and refluxed for three hours while being stirred with a magnetic stirrer. Distillation gives 6.8 parts (50 percent yield) of 1-phenyl-4,4,4-trifluoro-3-trifluoromethylbutene-2-one-1 with a boiling point of 49–51° C. at 0.35 mm. of mercury and a refractive index of $n_D^{25}$ 1.4404.

*Analysis.*—Calc'd for $C_{11}H_6F_6O$ (percent): C, 48.5; H, 2.5. Found (percent): C, 49.2; H, 2.3.

Mice are treated by aerosol exposure to the test compound in the following manner: The compound is administered as an aerosol into a 2.8 liter chamber. The exposure chamber consists of a 2.8 liter bell jar over a nebulizer inserted through the floor of the chamber. Mice are exposed for five minutes to 200 micrograms (1000 Ct). The compound is dissolved in acetone and, during a span of twenty seconds, the compound is sprayed up into the chamber. No further air is transferred into or out of the chamber during the five minute exposure.

After this exposure, irritant activity is observed in all mice exposed, but not in controls exposed to acetone alone. Irritant activity can be described as the presence of one or more of the following reactive signs:

Hyperemia of the nose, ears, and tail
Salivation
Ptosis
Dyspnea
Decreased locomotor activity
Blinking
Hunched posture
Face pawing.

Gerbils are treated to the test compound by exposure in a 16 liter static chamber in the following manner: The compound is dissolved in methylene chloride. The resulting colorless solution is sprayed into the chamber through a port in the bottom, animals being maintained around the entrance port. The spray impinges on the top of the chamber, then slowly settles down on the gerbils in the form of a vapor. The exposure time is one minute. A concentration which shows irritant activity is 2000 micrograms. The gerbils are removed from the chamber at the end of one minute exposure. Characteristic symptoms in the gerbil after exposure to irritants are the following:

Abnormal gait, consisting of rubbing the nose on the floor while walking about (shovelnosing)
Ptosis
Face pawing
Dyspnea Rats are treated in a manner similar to gerbils, and show the following symptoms in addition to the above:

Salivation
Lacrimation
Piloerection
Hyperactivity

Example 2

The Hastelloy C autoclave used in Example 1 is charged in the same way with 82.5 parts of 3-nitroacetophenone and 90 parts of hexafluoroacetone, sealed, and heated at 160° C. for eight hours. After cooling and venting the 155 parts of liquid remaining is distilled in a spinning band fractionating column to give 124.2 parts (75% yield) of 3-hydroxy-1-(3-nitrophenyl)-4,4,4-trifluoromethyl-1-butanone boiling at 117° C. at 0.17 mm. of mercury and with a refractive index of $n_D^{25}$ 1.4735.

*Analysis.*—Calc'd for $C_{11}H_7F_6NO_4$ (percent): C, 40.0; H, 2.1; N, 4.2. M.W. 329. Found (percent): C, 40.0; H, 2.4; N, 4.4. M.W. 331.

A flask attached to a reflux condenser with a calcium chloride tube at the top and a magnetic stirrer is charged with 15 parts of the 3-hydroxy-1-(3-nitrophenyl)-4,4,4-trifluoromethyl-1-butanone prepared above and with 40 parts of acetic anhydride and refluxed for 16 hours with stirring. Fractional distillation of the liquid gives 10.7 parts of 1-(3-nitrophenyl)-4,4,4-trifluoro-3-trifluoromethylbutene-2-one-1 with a boiling point of 94–95° at 0.3 mm. of mercury with a refractive index of $n_D^{25}$ 1.4757.

*Analysis.*—Calc'd for $C_{11}H_5F_6NO_3$ (percent): C, 42.1; H, 1.6; N, 4.5. Found (percent): C, 41.7; H, 1.7; N, 4.4.

Squirrel monkeys are exposed to the test compound in the folowing manner: The compound is dissolved in methylene chloride, forming a colorless solution. The solution is forced through a neublizer, and thence to a turbulence bulb, where the compound forms particles distinct from the vapor of the solvent. Both solute and solvent vapors are blown into a fifty liter chamber containing two monkeys. The animals are exposed to a concentration of 2000 micrograms for one minute, with constant flow of compound maintaining this concentration (dynamic chamber).

At the end of the exposure, the monkeys are removed from the chamber and caged in well ventilated quarters. Characteristic reactive signs seen in the chambers during exposure are the following Salivation
Face pawing
Lacrimation
Dyspnea

EXAMPLES 3–34

The following compounds are made in the manner of the compounds of Examples 1 and 2 by substituting the appropriate starting materials to form compounds of the formula:

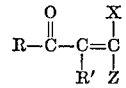

The meaning of R, R', X and Z is found in the table.

The product compounds are formulated and applied to animals in like manner to provide like results.

TABLE

| Example No. | R | R' | X | Z | Product | Properties |
|---|---|---|---|---|---|---|
| 3 | $(CH_3)_3C$ | H | $CF_3$ | $CF_3$ | 5,5-dimethyl-1,1,1-trifluoro-2-trifluoromethyl-2-hexen-4-one. | $B_{14}$ 52°. $n_D^{25}$ 1.3597. |
| 4 | $C_6H_5$ | H | $CF_2Cl$ | $CF_2Cl$ | 4-chloro-4,4-difluoro-3-(chlorodifluoro)-1-phenyl-2-buten-1-one. | $B_{0.2}$ 95°. $n_{D25}$ 1.4909. |
| 5 | $3\text{-}NO_2C_6H_4$ | H | $CF_2Cl$ | $CF_2Cl$ | 4-chloro-4,4-difluoro-3-(chlorodifluoro)-1-(m-nitrophenyl)-2-buten-1-one. | M.P. 60–61°. |
| 6 | $2\text{-}NO_2C_6H_4$ | H | $CF_3$ | $CF_3$ | 1-(o-nitrophenyl)-4,4,4-trifluoro-3-trifluoromethyl-2-buten-1-one. | $B_{0.03}$ 99–101°. M.P. 60–62°. |
| 7 | $4\text{-}NO_2C_6H_4$ | H | $CF_3$ | $CF_3$ | 1-(p-nitrophenyl)-4,4,4-trifluoro-3-trifluoromethyl-2-buten-1-one. | M.P. 42–4°. |
| 8 | $3\text{-}NO_2\text{-}4ClC_6H_3$ | H | $CF_3$ | $CF_3$ | 1-(4-chloro-3-nitrophenyl)-4,4,4-trifluoro-3-trifluoromethyl-2-buten-1-one. | M.P. 64–66°. |

TABLE—Continued

| Example No. | R | R' | X | Z | Product | Properties |
|---|---|---|---|---|---|---|
| 9 | 4-CH₃-C₆H₄ | H | CF₃ | CF₃ | 1-(p-tolyl)-4,4,4-trifluoro-3-trifluoromethyl-2-buten-1-one | B₀.₀₇ 76°. n_D²⁵ 1.4498. |
| 10 | 3-CH₃-C₆H₄ | H | CF₃ | CF₃ | 1-(m-tolyl)-4,4,4-trifluoro-3-trifluoromethyl-2-buten-1-one | B₀.₀₈ 74-75°. |
| 11 | 2-CH₃O-C₆H₄ | H | CF₃ | CF₃ | 1-(o-anisyl)-4,4,4-trifluoro-3-trifluoromethyl-2-buten-1-one | B₀.₀₇ 79-81° |
| 12 | 3-CH₃O-C₆H₄ | H | CF₃ | CF₃ | 1-(m-anisyl)-4,4,4-trifluoro-3-trifluoromethyl-2-buten-1-one | M.P. 81-83°. |
| 13 | 2,5-(CH₃O)₂C₆H₃ | H | CF₃ | CF₃ | 1-(2,5-dimethoxyphenyl)-4,4,4-trifluoro-3-trifluoromethyl-2-buten-1-one | M.P. 88-90.5°. |
| 14 | 3,4,5-(CH₃O)₃C₆H₂ | H | CF₃ | CF₃ | 4,4,4-trifluoro-3-trifluoromethyl-1-(3,4,5-tirmethoxyphenyl)-2-buten-1-one | M.P. 116-117° |
| 15 | 2-ClC₆H₄ | H | CF₃ | CF₃ | 1-(o-chlorophenyl)-4,4,4-trifluoro-3-trifluoromethyl-2-buten-1-one | B₀.₀₇ 68-69°. n_D²⁵ 1.4512. |
| 16 | 3-ClC₆H₄ | H | CF₃ | CF₃ | 1-(m-chlorophenyl)-4,4,4-trifluoro-3-trifluoromethyl-2-buten-1-one | B₀.₀₇ 67-69°. n_D²⁵ 1.4592. |
| 17 | 4-ClC₆H₄ | H | CF₃ | CF₃ | 1-(p-chlorophenyl)-4,4,4-trifluoro-3-trifluoromethyl-2-buten-1-one | M.P. 49-52°. |
| 18 | 2,5-Cl₂C₆H₃ | H | CF₃ | CF₃ | 1-(2,5-dichlorophenyl)-4,4,4-trifluoro-3-trifluoromethyl-2-buten-1-one | B₀.₁ 92°. M.P. 52-8°. |
| 19 | 4-BrC₆H₄ | H | CF₃ | CF₃ | 1-(p-bromophenyl)-4,4,4-trifluoro-3-trifluoromethyl-2-buten-1-one | M.P. 64-49°. |
| 20 | 4-FC₆H₄ | H | CF₃ | CF₃ | 1-(p-fluorophenyl)-4,4,4-trifluoro-3-trifluoromethyl-2-buten-1-one | B₀.₀₉ 69°. n_D²⁵ 1.4352. |
| 21 | 3-F-4-CH₃OC₆H₃ | H | CF₃ | CF₃ | 1-(3-fluoro-4-methoxyphenyl)-4,4,4-trifluoro-3-trifluoromethyl-2-buten-1-one | M.P. 50-52°. |
| 22 | 4-CNC₆H₄ | H | CF₃ | CF₃ | 4-[(3,3,3-trifluoro-2-trifluoromethyl)propenylcarbonyl]-benzonitrile | M.P. 70-72°. |
| 23 | 3-CF₃C₆H₄ | H | CF₃ | CF₃ | 4,4,4-trifluoro-3-trifluoromethyl-1-(3-trifluorotolyl)-2-buten-1-one | B₀.₀₇ 63°. n_D²⁵ 1.4143. |
| 24 | 4-C₆H₅C₆H₄ | H | CF₃ | CF₃ | 1-(4-biphenylyl)-4,4,4-trifluoro-3-trifluoromethyl-2-buten-1-one | M.P. 69-71°. |
| 25 | 1-naphthyl | H | CF₃ | CF₃ | 1-(1-naphthyl)-4,4,4-trifluoro-3-trifluoromethyl-2-buten-1-one | M.P. 83-85°. |
| 26 | 1-(4-chloronaphthyl) | H | CF₃ | CF₃ | 1-(4-chloronaphthyl)-4,4,4-trifluoro-3-trifluoromethyl-2-buten-1-one | B₀.₀₉ 140°. n_D²⁵ 1.5330. |
| 27 | 9-phenanthryl | H | CF₃ | CF₃ | 1-(p-anthryl)-4,4,4-trifluoro-3-trifluoromethyl-2-buten-1-one | M.P. 144-45°. |
| 28 | 2-furyl | H | CF₃ | CF₃ | 1-(2-furyl)-4,4,4-trifluoro-3-trifluoromethyl-2-buten-1-one | B₀.₀₈ 56°. n_D²⁵ 1.4223. |
| 29 | 2-thienyl | H | CF₃ | CF₃ | 1-(2-thienyl)-4,4,4-trifluoro-3-trifluoromethyl-2-buten-1-one | B₀.₁ 71-2°. n_D²⁵ 1.4560. |
| 30 | 2-thienyl | H | CF₂Cl | CF₂Cl | 4,4,4-tirfluoro-3-trifluoromethyl-1-(2-thienyl)-2-buten-1-one | B₀.₁ 103-5°. n_D²⁵ 1.5077. |
| 31 | 2-thienyl | CH₃ | CF₃ | CF₃ | 2-methyl-1-(2-thienyl)-4,4,4-trifluoro-3-trifluoromethyl-2-buten-1-one | B₀.₁₁ 72°. n_D²⁵ 1.4598 |
| 32 | C₆H₅ | CH₃ | CF₃ | CF₃ | 2-methyl-4,4,4-trifluoro-3-trifluoromethyl-2-buten-1-one | B₀.₀₇ 70°. n_D²⁵ 1.4416. |
| 33 | C₆H₅ | (1) | CF₃ | CF₃ | 2-(hexafluoroisopropylidene)-1-decanophenone | B₀.₂ 114-15°. |
| 34 | C₆H₅CH=CH | H | CF₃ | CF₃ | 6-phenyl-1,1,1-trifluoro-2-trifluoromethyl-2,5-butadien-4-one | B₀.₁₅ 96-97°. n_D²⁵ 1.4995. |

¹ n-Octyl.

EXAMPLE 35

Cyclic ketones also undergo a reaction similar to those of Examples 1–34 as shown by this example. Norcamphor (55 parts) and 100 parts of hexafluoroacetone are charged into a Hastelloy C autoclave and heated for 4 hours at 160° and then for 4 hours at 180° C. The product is distilled (B₂₀ 109–111°) and recrystallized from methylcyclohexane to give 58 g. (42% yield) of 3-[(1-hydroxy-2,2,2-trifluoro-1 - trifluoromethyl)ethyl]-2-norbornanone with a melting point of 81–83° C.

*Analysis.*—Calc'd for $C_{10}H_{10}F_6O_2$ (percent): C, 43.1; H, 3.6. Found (percent): C, 42.6; H, 3.6.

3-[(1-hydroxy - 2,2,2 - trifluoro-1 - trifluoromethyl)]ethyl]-2-norbornanone (27.6 parts), 10 parts of dry xylene, 23.2 parts of thionyl chloride and 0.4 parts of dimethylformamide are refluxed for three days with stirring and protected from atmospheric moisture. Distillation gives 15.3 parts (60% yield) of 3-[2,2,2-trifluoro-1-trifluoromethyl)ethylidene] - bicyclo[2.2.1]-heptane-2-one with a boiling point of 94–97° at 12 mm. Hg and a refractive index of $n_D^{25}$ 1.4203.

*Analysis.*—Calc'd for $C_{10}H_8F_6O$ (percent): C, 46.5; H, 3.1. Found (percent): H, 46.2; H, 3.5.

EXAMPLE 36

Norcamphor and dichlorotetrafluoroacetone as intermediates substituted in like amount by weight for the intermediates of Example 35 give [[2-chloro-1-(chlorodifluoromethyl) - 2,2-difluoro - 1-hydroxy]ethyl]bicyclo [2.2.1]-heptane-2-one, melting point 54.7° C.

*Analysis.*—Calc'd for $C_{10}H_{10}Cl_2F_4O_2$ (percent): C, 38.8; H, 3.2; Cl, 22.9. Found (percent): C, 39.1; H, 3.5; Cl, 22.5) which on dehydration gives 3-[[2-chloro-2,2-difluoro-1-(chloro-difluoro)] - ethylidene]bicyclo[2.2.1]-heptone-2-one, boiling point 90–93°/0.75 mm., refractive index $n_D^{25}$ 1.4656.

*Analysis.*—Calc'd for $C_{10}H_8Cl_2F_4O$ (percent): C, 41.2; H, 2.8; Cl, 2.44. Found (percent): C, 41.3; H, 3.4; Cl, 2.47.

EXAMPLE 37

α-Tetralone and hexafluoroacetone as intermediates substituted in like amount by weight for the intermediates of Example 35 give 2-(2,2,2-trifluoro-1-hydroxy-1-trifluoromethyl)ethyl-3,4 - dihydro - 1(2H)-naphthalenone, melting point 74–75° C. which on dehydration gives 2-(hexafluoroisopropylidene) - 3,4 - dihydro-1(2H)-naphthalenone, boiling point 68° C. at 0.1 mm. Hg and refractive index $n_D^{25}$ 1.4826.

*Analysis.*—Calc'd for $C_{13}H_8F_6O$ (percent): C, 53.0; H, 2.7. Found (percent): C, 52.8; H, 2.7.

EXAMPLE 38

7-nitro-1-tetralone and hexafluoroacetone as intermediates substituted in like amount by weight for the intermediates of Example 35 give 2-[(2-hydroxy-3,3,3-trifluoro-2-trifluoromethyl)ethyl] - 7-nitro - 3,4-dihydro-1 (2H)-naphthalenone, melting point 140–2° C.

*Analysis.*—Calc'd for $C_{13}H_9F_6NO_4$ (percent): C, 43.7; H, 2.5; N, 3.9. Found (percent): C, 44.2; H, 2.8; N, 4.3, which on dehydration gave 7-nitro-2-hexafluoroisopropylidene-3,4-dihydro - 1(2H)-naphthalenone, melting point 128–130° C.

*Analysis.*—Calc'd for $C_{13}H_7F_6NO_3$ (percent): C, 46.0; H, 2.1; N, 4.1. Found (percent): C, 46.1; H, 2.2; N, 4.2.

I claim:

1. A compound of the formula:

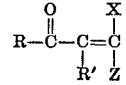

wherein

R is selected from the group consisting of t-butyl, phenyl, methyl-, cyano-, fluoro-, chloro-, bromo-, methoxy-, nitro-substituted phenyl, naphthyl, chloronaphthyl, furyl, thienyl, and β-phenylethenyl;

R' is selected from the group consisting of hydrogen and alkyl of 1 through 8 carbon atoms;

R and R' are joined to form a radical selected from the group consisting of cyclopentyl, α-etetrahydronaphthalene, 7-nitrotetrahydronaphthalene and norbornyl;

X is selected from the group consisting of chlorodifluoromethyl and trifluoromethyl; and Z is selected from the group consisting of chlorodifluoromethyl and trifluoromethyl.

2. A compound according to claim 1 which has the formula:

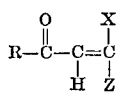

wherein

R is selected from the group consisting of t-butyl, phenyl, methyl-, cyano-, fluoro-, chloro-, bromo-, methoxy-, nitro-substituted phenyl, naphthyl, chloronaphthyl, furyl, thienyl, and β-phenylethenyl;

X is selected from the group consisting of chlorodifluoromethyl and trifluoromethyl; and Z is selected from the group consisting of chlorodifluoromethyl and trifluoromethyl.

3. A compound according to claim 1 which is 1-(3-chlorophenyl)4,4,4-trifluoro-3 - trifluoromethyl-2-buten-1-one.

4. A compound according to claim 1 which is 1-(3-nitrophenyl)-4,4,4-trifluoro-3 - trifluoromethyl-2-buten-1-one.

References Cited

UNITED STATES PATENTS

| 3,185,734 | 5/1965 | Fawcett et al. | 260—586 |
| 3,238,090 | 3/1966 | Szabo et al. | 260—590 X |
| 3,323,984 | 6/1967 | Szabo et al. | 260—347.8 X |

LELAND A. SEBASTIAN, Primary Examiner

U.S. Cl. X.R.

260—332.3 R, 347.8, 586 R, 587, 592, 593 H, 594, 999; 424—275, 285, 331, 332